No. 793,753. PATENTED JULY 4, 1905.
G. S. WALKER.
MECHANISM FOR OPERATING WATER OR OTHER FLUID GATES.
APPLICATION FILED FEB. 20, 1904.
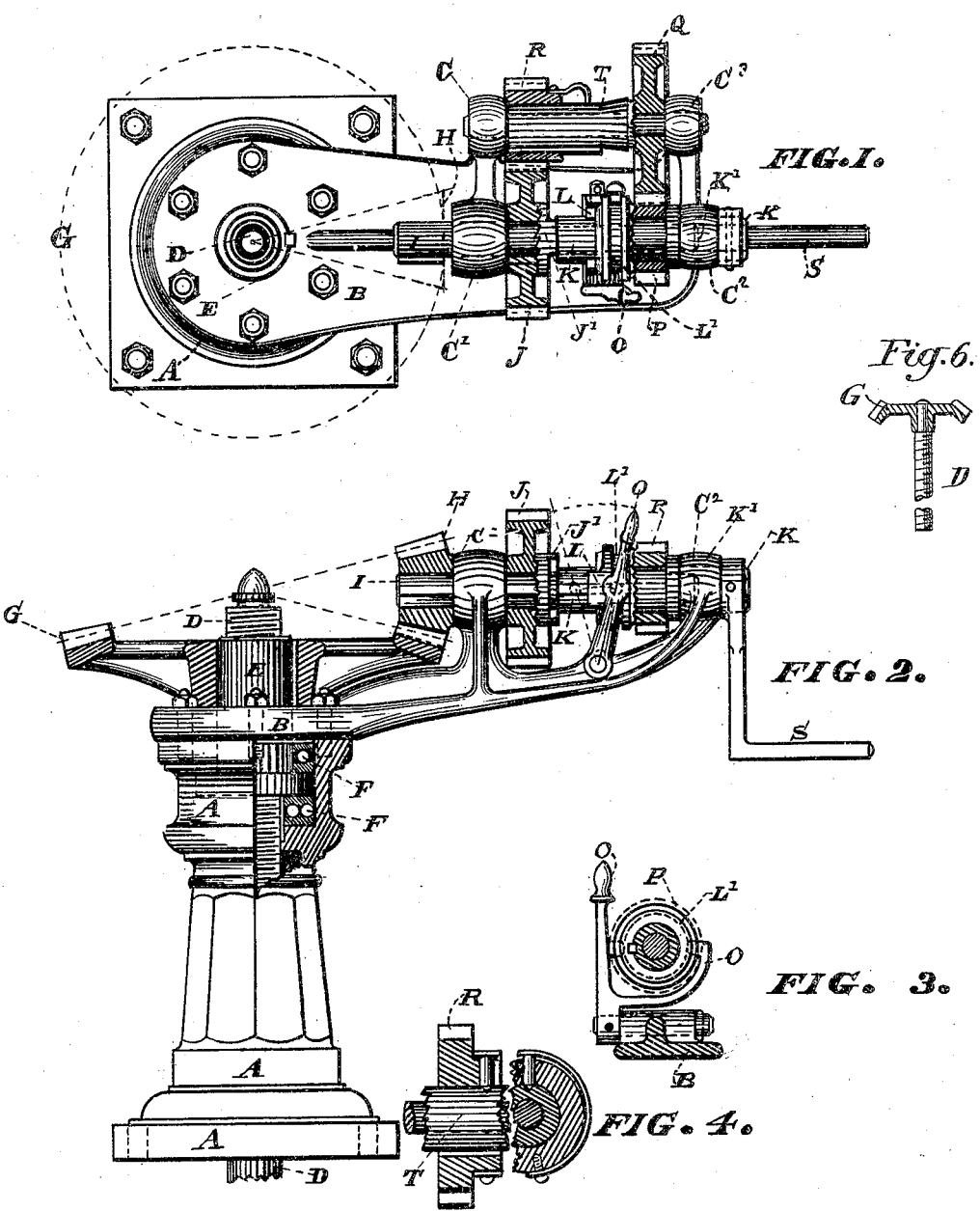
WITNESSES:
INVENTOR.
Geo. Sutherland Walker
BY
D. N. B. Coffin
ATTORNEY.

No. 793,753.                                                   Patented July 4, 1905.

UNITED STATES PATENT OFFICE.

GEORGE S. WALKER, OF BOSTON, MASSACHUSETTS, ASSIGNOR TO COFFIN VALVE COMPANY, OF BOSTON, MASSACHUSETTS, A CORPORATION OF MASSACHUSETTS.

MECHANISM FOR OPERATING WATER OR OTHER FLUID GATES.

SPECIFICATION forming part of Letters Patent No. 793,753, dated July 4, 1905.

Application filed February 20, 1904. Serial No. 194,609.

*To all whom it may concern:*

Be it known that I, GEORGE SUTHERLAND WALKER, a citizen of the United States, residing in Boston, in the county of Suffolk and State of Massachusetts, have invented certain new and useful Improvements in Mechanism for Operating Water or other Fluid Gates, of which the following is a specification.

This invention or improvement relates to a change-speed mechanism particularly adapted for operating water-gates; and the invention consists in the novel construction and arrangement of parts fully described below and illustrated in the accompanying drawings, in which—

Figure 1 is a plan view of a gate-stand with my improved mechanism applied thereto, certain of the gear-wheels being shown in horizontal section and the gear-wheel on the valve-stem having been removed and its position indicated by a broken line. Fig. 2 is a view, partly in elevation and partly in vertical section, of the same. Fig. 3 is a view, partly in elevation and partly in cross-section, showing the shipping-lever and a portion of the clutch. Fig. 4 is a sectional detail illustrating a spring-clutch or lock for engaging the gear R. Fig. 5 is a sectional detail of the same, taken at right angles to the section shown in Fig. 4. Fig. 6 is a detail showing the valve-stem with the gear-wheel keyed thereon, as is the case when a non-rising valve-stem is employed.

Similar letters of reference indicate corresponding parts.

The gate-stand comprises the post A and cap B, said cap B being provided with an arm or extension integral therewith and supporting bearings C, C', C², and C³ for sustaining horizontal shafts below described.

D represents the valve-stem, screw-threaded, as shown, to receive a nut E, supported in the tubular post A and adapted to rotate therein, ball-bearings F being preferably provided between said nut and post. When what is termed a "rising stem" is employed, the nut is keyed to a gear G, as indicated in Figs. 1 and 2; but when a non-rising stem is used the valve-stem itself is keyed to the gear G, as shown in Fig. 6, my invention being applicable to either a rising or non-rising valve-stem.

The bevel-gear G is engaged by a pinion H, rigid on a horizontal shaft I, supported near one end in the bearing C', and keyed to the same shaft is a gear-wheel J, which has integral or rigid with its outer face one member J' of a clutch. The outer end of this shaft is reduced in diameter and has its bearings at that end in the tubular shaft K which is supported in the bearings C², the end of the shaft I being at about the point indicated at K'. Splined on this shaft K is a gear-wheel P, which has rigid or integral with its inner face the other member L of the clutch. The gear-wheel P and the clutch member L are thus adapted to slide on the shaft K, being operated by a shipping-lever O, which engages the clutch member L by means of the groove L', said shipping-lever being pivotally secured to the arm of the cap B, as indicated in Figs. 2 and 4.

Rigid on a horizontal shaft supported by the bearings C and C³ and substantially parallel with the shaft I is a gear-wheel Q, which is in engagement with the gear-wheel P, and splined on a sleeve T, which is rigid on the same shaft as the gear-wheel Q, is the pinion R. By means of a suitable spring-catch, of which one style is illustrated in Fig. 1 and another style in Fig. 5, the pinion R may be locked into engagement with the gear-wheel J, or it may by disengaging the catch from the sleeve T be slid on said sleeve out of engagement with the gear J.

When the parts are in the position indicated in Figs. 1 and 2, the clutch members J' and L are out of engagement, and when the shaft I is rotated—as, for example, by means of a crank S—the smaller gear-wheel or pinion P engages the larger gear-wheel Q and through the tight sleeve T the pinion R, which engages the gear-wheel J, rigid on the shaft I, and the pinion H engages the bevel gear-wheel G, thus actuating the valve-stem D with moderate speed and increased power. By throwing the lever over to the left the clutch member L is moved into engagement with the member K and the gear-wheel P out of engagement with the gear-wheel Q, and motion is imparted direct to the gear-wheel J, which is integral with the member J', and a higher speed and less power are obtained. During this last operation—that is, when the gear-wheel J is engaged directly and the gear-wheels P and Q are out of engagement—the pinion R and the gear-wheel Q may revolve idly, or the pinion R may be moved out of engagement with the gear-wheel J by moving the spring-catch out of engagement with the sleeve T, thus saving the friction and power required to move said gears R and Q and the gear P.

I do not, of course, confine myself to the exact proportions illustrated of the different gears, as gears of other proportions may easily be substituted without interfering with the other parts of the machine, and thus different speeds and degrees of power applied, as circumstances may require.

Having thus fully described my invention, what I claim, and desire to secure by Letters Patent, is—

1. In a change-speed mechanism, the combination of a threaded shaft, a bevel-gear operatively connected therewith, a main shaft reduced in diameter at one end, a bevel-pinion on the main shaft and meshing with the bevel-gear, a spur-gear rigid on said main shaft, a clutch member rigid with the spur-gear, a hollow shaft constituting a bearing for the reduced end of the main shaft, a gear splined to the hollow shaft and having a clutch member rigid with it, mechanism for moving the gear on the hollow shaft whereby the two members of the clutch are brought into engagement, a counter-shaft, and gears secured thereto adapted to engage said sliding gear and spur-gear respectively.

2. In a change-speed mechanism, the combination of a threaded shaft, a main shaft reduced in diameter at one end, mechanism intermediate of said two shafts whereby motion is transmitted from the main shaft to the threaded shaft, a spur-gear rigid on said main shaft and provided with a clutch-face, a hollow shaft constituting a bearing for the reduced end of the main shaft, a gear splined to the hollow shaft and provided with a clutch-face, mechanism for sliding the gear on the hollow shaft toward the gear on the main shaft thereby bringing the two clutch members into engagement, a counter-shaft, a gear-wheel on said counter-shaft meshing with the gear on the hollow shaft, and a pinion supported by the counter-shaft adapted to engage the gear-wheel on the main shaft.

3. In a change-speed mechanism, the combination of a threaded shaft, a main shaft reduced in diameter at one end, mechanism intermediate of said two shafts whereby motion is transmitted from the main shaft to the threaded shaft, a spur-gear rigid on said main shaft and provided with a clutch-face, a hollow shaft constituting a bearing for the reduced end of the main shaft, a gear splined to the hollow shaft and provided with a clutch-face, mechanism for sliding the gear on the hollow shaft toward the gear on the main shaft thereby bringing the two clutch members into engagement, a counter-shaft, a gear-wheel on said counter-shaft meshing with the gear on the hollow shaft, and a pinion splined to the counter-shaft and adapted to be moved into and out of engagement with the gear-wheel on the main shaft.

4. In a change-speed mechanism, the combination of a threaded shaft, a main shaft reduced in diameter at one end, mechanism intermediate of said two shafts whereby motion is transmitted from the main shaft to the threaded shaft, a spur-gear rigid on said main shaft and provided with a clutch-face, a hollow shaft constituting a bearing for the reduced end of the main shaft, a gear splined to the hollow shaft and provided with a clutch-face, mechanism for sliding the gear on the hollow shaft toward the gear on the main shaft thereby bringing the two clutch members into engagement, a counter-shaft, a gear-wheel on said counter-shaft meshing with the gear on the hollow shaft, a pinion splined to the counter-shaft and adapted to be moved into and out of engagement with the gear-wheel on the main shaft, and mechanism for locking said pinion to the counter-shaft.

5. In a change-speed mechanism, a main shaft, a shaft for receiving motion from the main shaft, mechanism intermediate of the two said shafts for transmitting said motion, a third shaft rotating on the same axial line as the main shaft and adjacent thereto, a gear-wheel on the main shaft, a clutch member rigid therewith, a gear-wheel splined to the third shaft, a clutch member rigid on said gear-wheel, a counter-shaft, means for sliding the gear-wheel on the third shaft toward the gear-wheel on the main shaft thereby bringing the two clutch members into engagement, and gears secured to the counter-shaft adapted to engage the sliding gear and spur-gear respectively.

6. In a change-speed mechanism, a main shaft, a shaft for receiving motion from the main shaft, mechanism intermediate of the two said shafts for transmitting said motion, a third shaft rotating on the same axial line as the main shaft and adjacent thereto, a gear-wheel on the main shaft, a clutch member rigid therewith, a gear-wheel splined to the third shaft, a clutch member rigid on said gear-wheel, a counter-shaft, means for sliding the gear-wheel on the third shaft toward the gear-wheel on the main shaft thereby bringing the two clutch members into engagement, a gear-wheel on the counter-shaft meshing with the gear-wheel on the third shaft, and a pinion splined to the counter-shaft and adapted to be moved into and out of engagement with the gear on the main shaft.

7. In a change-speed mechanism, a main shaft, a shaft for receiving motion from the main shaft, mechanism intermediate of the two said shafts for transmitting said motion, a third shaft rotating on the same axial line as the main shaft and adjacent thereto, a gear-wheel on the main shaft, a clutch member rigid therewith, a gear-wheel splined to the third shaft, a clutch member rigid on said gear-wheel, a counter-shaft, means for sliding the gear-wheel on the third shaft toward the gear-wheel on the main shaft thereby bringing the clutch members into engagement, a gear-wheel on the counter-shaft meshing with the gear-wheel on the third shaft, a pinion splined to the counter-shaft meshing with the gear-wheel on the main shaft, and mechanism for locking said pinion to the counter-shaft.

GEORGE S. WALKER.

Witnesses:
   E. J. CHADBOURNE,
   D. N. B. COFFIN.